United States Patent
Forsyth

[11] Patent Number: 5,885,182
[45] Date of Patent: Mar. 23, 1999

[54] FOUR-WHEEL DRIVE TRANSMISSION FOR MOTOR VEHICLES

[76] Inventor: John R. Forsyth, 186 Minot, Romeo, Mich. 48065

[21] Appl. No.: 820,202

[22] Filed: Mar. 19, 1997

Related U.S. Application Data

[63] Continuation-in-part of Ser. No. 556,332, Nov. 13, 1995, Pat. No. 5,662,543.

[51] Int. Cl.[6] .................................................. F16H 37/08
[52] U.S. Cl. .......................... 475/198; 475/207; 180/249
[58] Field of Search ................................... 475/198, 200, 475/206, 207; 180/247, 248, 249, 250

[56] References Cited

U.S. PATENT DOCUMENTS

| | | |
|---|---|---|
| 2,262,710 | 11/1941 | Lang . |
| 3,235,021 | 2/1966 | Hill . |
| 3,732,943 | 5/1973 | Panhard . |
| 4,643,045 | 2/1987 | Katayama . |
| 4,671,136 | 6/1987 | Katayama . |
| 4,779,699 | 10/1988 | Hatano . |
| 4,805,720 | 2/1989 | Clenet . |
| 4,817,753 | 4/1989 | Hiketa . |
| 4,831,891 | 5/1989 | Kato et al. . |
| 4,875,698 | 10/1989 | Uchiyama . |
| 5,042,610 | 8/1991 | Shiraishi et al. . |
| 5,046,998 | 9/1991 | Frost . |
| 5,086,867 | 2/1992 | Hirota et al. . |
| 5,123,293 | 6/1992 | Umemoto et al. . |
| 5,143,167 | 9/1992 | Moriyama et al. . |
| 5,188,574 | 2/1993 | Echigo et al. . |
| 5,370,018 | 12/1994 | Kwasniewski . |
| 5,443,426 | 8/1995 | Frost . |
| 5,651,749 | 7/1997 | Wilson et al. ........................ 475/198 X |
| 5,655,986 | 8/1997 | Wilson et al. ........................ 475/206 X |
| 5,662,543 | 9/1997 | Forsyth ................................... 475/198 |
| 5,695,022 | 12/1997 | Zalewski et al. ........................ 180/249 |
| 5,702,321 | 12/1997 | Bakowshi et al. .................. 180/249 X |
| 5,704,866 | 1/1998 | Pritchard et al. ....................... 475/206 |
| 5,704,867 | 1/1998 | Bowen ............................... 475/205 X |
| 5,720,688 | 2/1998 | Wilson et al. ...................... 475/198 X |

FOREIGN PATENT DOCUMENTS

2035930  6/1989  United Kingdom .

Primary Examiner—Charles A. Marmor
Assistant Examiner—Peter T. Kwon
Attorney, Agent, or Firm—Harness, Dickey & Pierce, P.L.C.

[57] ABSTRACT

A transmission for a four-wheel drive vehicle incorporating a multi-speed geartrain which delivers power to the front and rear drivelines through an interaxle differential. A lock-out clutch is provided to selectively inhibit speed differentiation across the interaxle differential. Additionally, a driveline disconnect system including a synchronizer clutch assembly is provided to allow one of the drivelines to be disengaged for establishing two-wheel drive operation.

19 Claims, 13 Drawing Sheets

| DRIVE MODE | RANGE CLUTCH | LOCK-OUT CLUTCH | MODE CLUTCH |
|---|---|---|---|
| 2WH | HI | L | 2WD |
| 4WH (PART-TIME) | HI | L | 4WD |
| 4WH (FULL-TIME) | HI | O | 4WD |
| N | N | L OR O | 4WD OR 2WD |
| 4WL (FULL-TIME) | LO | O | 4WD |
| 4WL (PART-TIME) | LO | L | 4WD |
| 2WL | LO | L | 2WD |

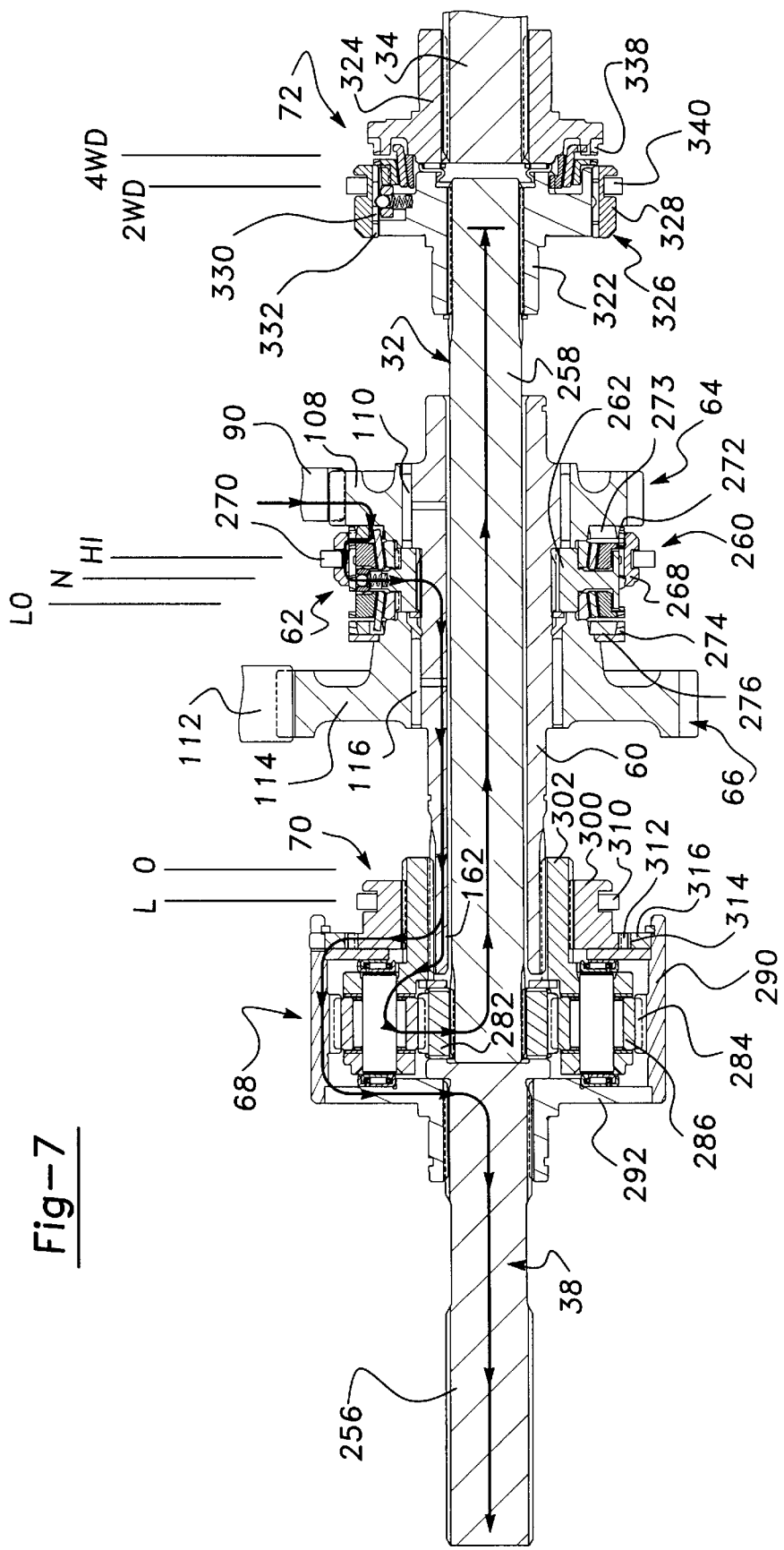

FOUR-WHEEL DRIVE TRANSMISSION FOR MOTOR VEHICLES

CROSS-REFERENCE TO RELATED APPLICATIONS

This application is a continuation-in-part of U.S. application Ser. No. 08/556,332, filed Nov. 3, 1995, now U.S. Pat. No. 5,662,543.

BACKGROUND OF THE INVENTION

The present invention relates generally to transmissions for use in four-wheel drive vehicles. More particularly, the present invention is directed to a transmission having a multi-speed geartrain and a power transfer arrangement contained in a single unit for establishing various two-wheel and four-wheel drive modes.

As is known, the majority of four-wheel drive vehicles are equipped with a transfer case mounted to a multi-speed transmission for directing power from the engine to all four wheels. To accommodate different road surfaces and conditions, many transfer cases are equipped with a mode shift mechanism which permits the vehicle operator to selectively de-couple one set of wheels for establishing a two-wheel drive mode in addition to the four-wheel drive mode. In addition, some transfer cases are also equipped with a gear reduction unit for providing a high-range (i.e., direct drive) and a low-range (i.e., reduced ratio drive) four-wheel drive mode. Finally, some transfer cases are equipped with an interaxle differential for permitting torque proportioning and speed differentiation between the front and rear drivelines of the four-wheel drive vehicle.

In an effort to minimize the overall size of the drivetrain used in four-wheel drive vehicles, it has been proposed to utilize a transmission of a transaxle-type normally used to drive the front wheels of a front wheel drive vehicle as a four-wheel drive geartrain. In particular, British Patent No. 2,035,930 to Jones et al. teaches of rotating the front wheel drivetrain (i.e., engine and transaxle) 90° such that the transaxle outputs can be interconnected to the front and rear drivelines of the motor vehicle. While such an arrangement may provide an economical drivetrain layout for a full-time four-wheel drive vehicle, the practical applications for such an arrangement are severely limited. In particular, such an arrangement does not permit the vehicle operator to selectively shift "on-the-fly" between high and low four-wheel drive modes, nor can one of the outputs be selectively disconnected from its driveline for establishing a two-wheel drive mode.

Accordingly, the need exists for a transmission which can be used in most conventional four-wheel drive applications and which permits the vehicle operator to selectively shift between the available drive modes and speed ranges.

SUMMARY OF THE INVENTION

It is therefore an object of the present invention to provide a transmission for use with four-wheel drive vehicles having a multi-speed geartrain and a power transfer mechanism integrated into a single unit.

A further object of the present invention is to provide the power transfer mechanism of the transmission with a synchronized mode shift mechanism for permitting the vehicle operator to selectively shift "on-the-fly" between a four-wheel drive mode and a two-wheel drive mode.

It is another object of the present invention to provide the power transfer mechanism of the transmission with a synchronized range shift mechanism for permitting the vehicle operator to shift "on-the-fly" between a four-wheel low-range drive mode and a four-wheel high-range drive mode.

It is yet a further object of the present invention to provide the power transfer mechanism of the transmission with an interaxle differential for establishing full-time four-wheel high-range and low-range drive modes. As a related object, means are provided for selectively locking the interaxle differential to establish part-time four-wheel high-range and low-range drive modes.

Accordingly, the improved transmission of the present invention includes a multi-speed geartrain including a input shaft, a mainshaft, and a plurality of constant-mesh gearsets arranged for selectively coupling the mainshaft to the input shaft for driven rotation at various speed ratios. The mainshaft can be selectively coupled to a power transfer mechanism for establishing two alternative power transmission routes. In particular, a synchronized range shift mechanism is provided for establishing a high-range transmission route and a low-range transmission route from the mainshaft to a quill shaft which, in turn, drives an interaxle differential. The torque delivered by the quill shaft is split by the interaxle differential between the front and rear drivelines to establish differentiated or "full-time" four-wheel high-range and low-range drive modes. Additionally, a lock-out mechanism is provided for permitting the interaxle differential to be locked for establishing non-differentiated or "part-time" four-wheel high-range and low-range drive modes. Finally, a mode shift mechanism is provided for permitting one of the drivelines to be selectively disconnected from the transmission for establishing a two-wheel drive mode.

BRIEF DESCRIPTION OF THE DRAWINGS

Further objects, features and advantages of the present invention will become apparent to those skilled in the art from studying the following description and the accompanying drawings in which:

FIG. 7 is a view, similar to FIG. 6, illustrating the power transmission route through the power transfer mechanism of the transmission for establishing a two-wheel high-range drive mode;

DETAILED DESCRIPTION OF THE PREFERRED EMBODIMENTS

The present invention relates to a multi-speed transmission for use in four-wheel drive vehicles. In general, the transmission integrates a multi-speed geartrain and a power transfer mechanism into a common housing and is adapted for use with a longitudinally-aligned engine. More particularly, the geartrain provides at least five forward speed ratios and a reverse drive which are delivered to the power transfer mechanism for distribution to the vehicle's front and rear drivelines. The power transfer mechanism can be provided in several different arrangements to provide different combinations of available drive modes. For example, the power transfer mechanism may include a synchronized range shift mechanism for permitting the vehicle to be shifted "on-the-fly" between a high (i.e., direct drive) speed range and a low (i.e., reduced ratio) speed range. Additionally, the power transfer mechanism may include an interaxle differential interconnecting the output of the range shift mechanism to the front and rear drivelines for establishing full-time (i.e., "differentiated") four-wheel high-range and low-range drive modes. A differential lock-out mechanism can also be provided for selectively locking the interaxle differential to establish part-time (i.e., "non-differentiated") four-wheel high-range and low-range drive modes. Finally, the power transfer mechanism can include a synchronized mode shift mechanism operable for selectively connecting and disconnecting the transmission from the one of the drivelines for shifting "on-the-fly" between a two-wheel drive mode and a four-wheel drive mode. As will be understood, the various novel transmissions to be disclosed hereafter are shown in a merely exemplary vehicular application to which modifications can be made.

Figures 1, 8:
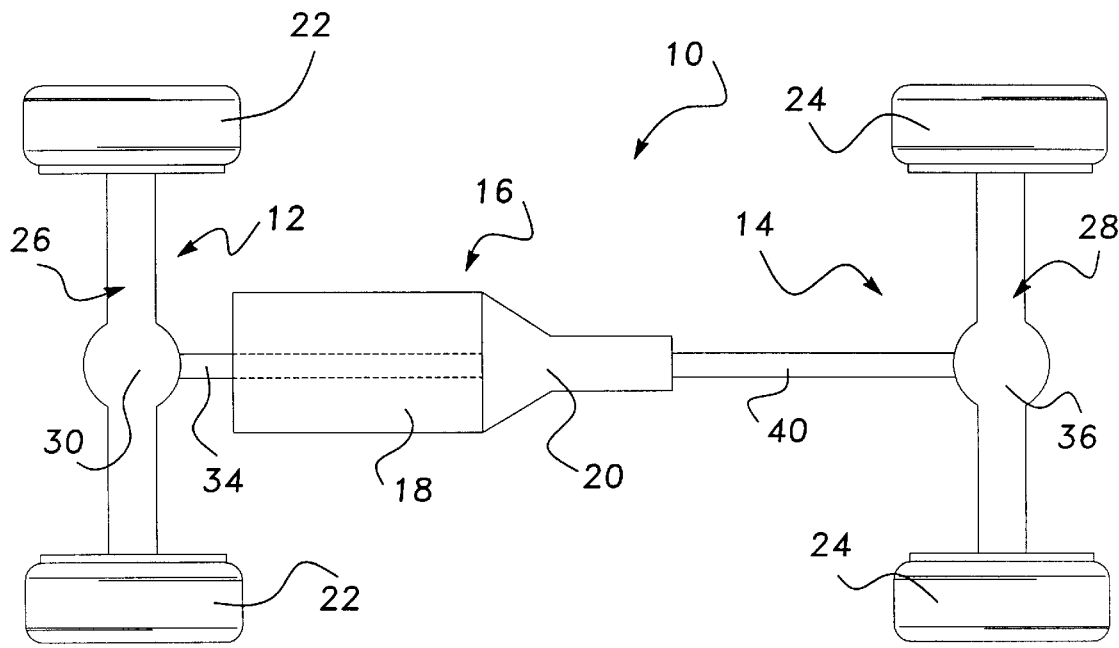
FIG. 1 is a schematic view of a four-wheel drive motor vehicle equipped with a transmission according to the present invention.
FIG. 8 is a table listing the combination of speed ranges and drive modes available with the transmission of the present invention.

Referring to FIG. 1, a vehicle 10 is schematically shown which is suited for use with the present invention. Vehicle 10 has a front driveline 12 and a rear driveline 14 drivable from a drivetrain 16. Drivetrain 16 includes an engine 18 and a transmission 20. Engine 18 is mounted in an in-line or longitudinal orientation along the long axis of vehicle 10 and its output is coupled to the input of transmission 20. Front and rear wheels 22 and 24 are part of front and rear drivelines 12 and 14, respectively, and are connected at opposite ends of front and rear axle assemblies 26 and 28, respectively. Front axle assembly 26 includes a front differential 30 that is coupled to a front output 32 (FIG. 2) of transmission 20 via a front prop shaft 34. Likewise, rear axle assembly 28 includes a rear differential 36 that is coupled to a rear output 38 of transmission 20 via a rear prop shaft 40. As is conventional, one or more universal joints (not shown) may be installed on opposite ends of prop shafts 34 and 40, as required.

Figure 2:
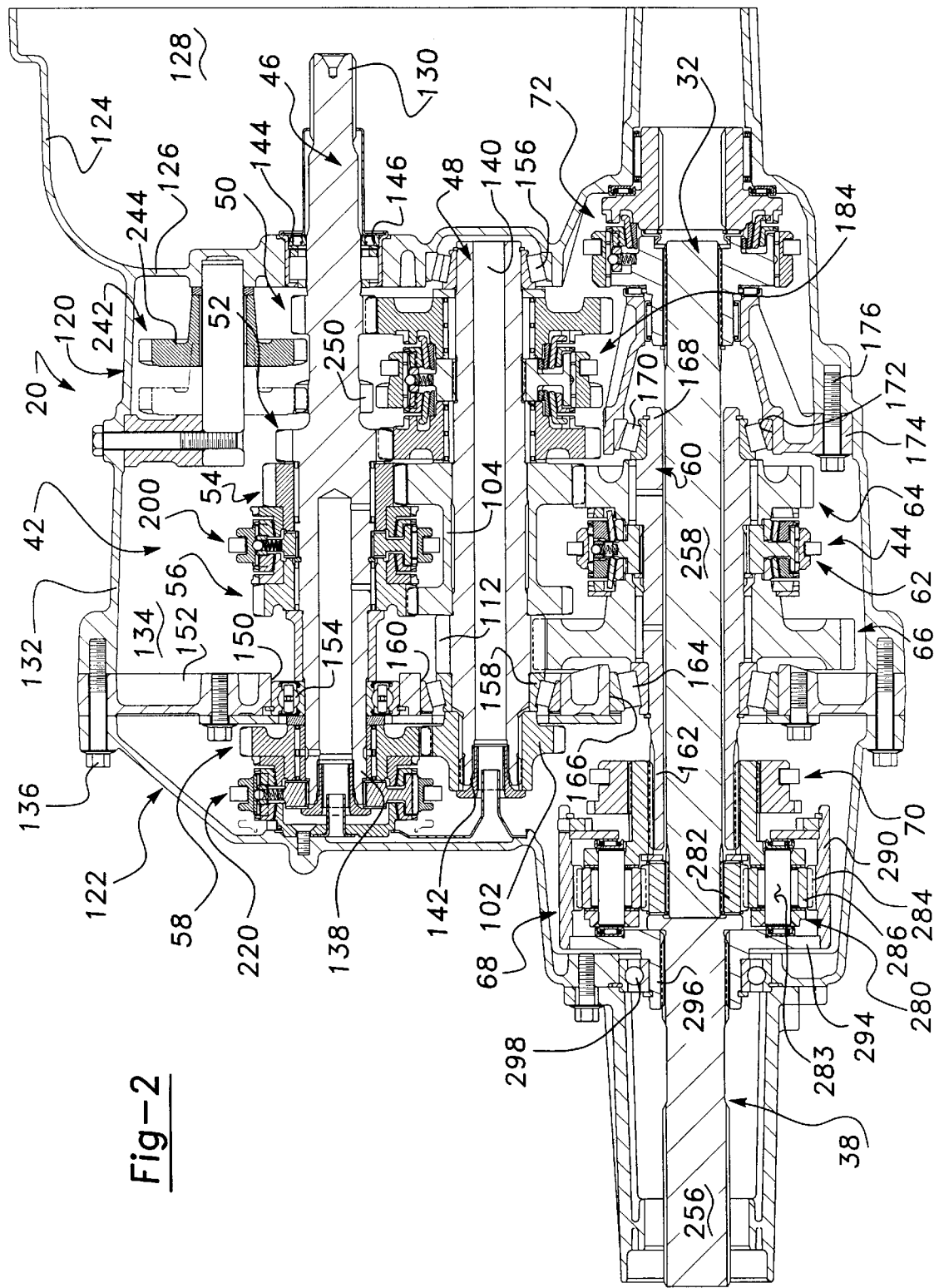
FIG. 2 is a sectional view of the transmission constructed according to a preferred embodiment of the present invention.

With particular reference to FIG. 2, transmission 20 is shown to include two primary sections, namely, a multi-speed geartrain 42 and a power transfer mechanism 44. Geartrain 42 includes an input shaft 46 driven by the output of engine 18 through engagement of a conventional manually-operable clutch (not shown), a mainshaft 48, and a series of constant-mesh gearsets 50, 52, 54, 56 and 58. Each gearset can be selectively engaged for coupling mainshaft 48 to input shaft 46 for rotation at a predetermined gear or speed ratio. Thus, power from engine 18 is selectively delivered from input shaft 46 to mainshaft 48 through the gearsets. Power is thereafter delivered from mainshaft 48 to front and rear outputs 32 and 38 via power transfer mechanism 44. In particular, power transfer mechanism 44 of transmission 20 includes a quill shaft 60, a synchronized range shift mechanism 62 including a high-range constant-mesh gearset 64 and a low-range constant-mesh gearset 66, and an interaxle differential 68 interconnecting quill shaft 60 to front output 32 and rear output 38. Interaxle differential 68 permits speed differentiation between front output 32 and rear output 38 while delivering drive torque thereto from geartrain 42 at a predetermined torque split or ratio. Accordingly, full-time high-range and low-range four-wheel drive modes are provided by transmission 20. While interaxle differential 68 is specifically shown as a planetary-type gearset, it will be appreciated that any suitable equivalent differential device known in the transmission art can be used in substitution therefor. Power transfer mechanism 44 is also shown to include a lock-out mechanism 70 for selectively locking interaxle differential 68 to inhibit speed differentiation between front output 32 and rear output 38. Lock-out mechanism 70 is operable in an "open" mode to permit differentiation across interaxle differential 68 and establish the full-time four-wheel high-range and low-range drive modes. Lock-out mechanism 70 is also operable in a "Locked" mode to inhibit differentiation across interaxle differential 68 for establishing part-time four-wheel high-range and low-range drive mode. Finally, power transfer mechanism 44 of transmission 20 includes a synchronized mode select mechanism 72 for selectively connecting and disconnecting front output 32 and front prop shaft 34 for establishing a two-wheel drive mode in addition to the four-wheel drive mode.

Figure 3:
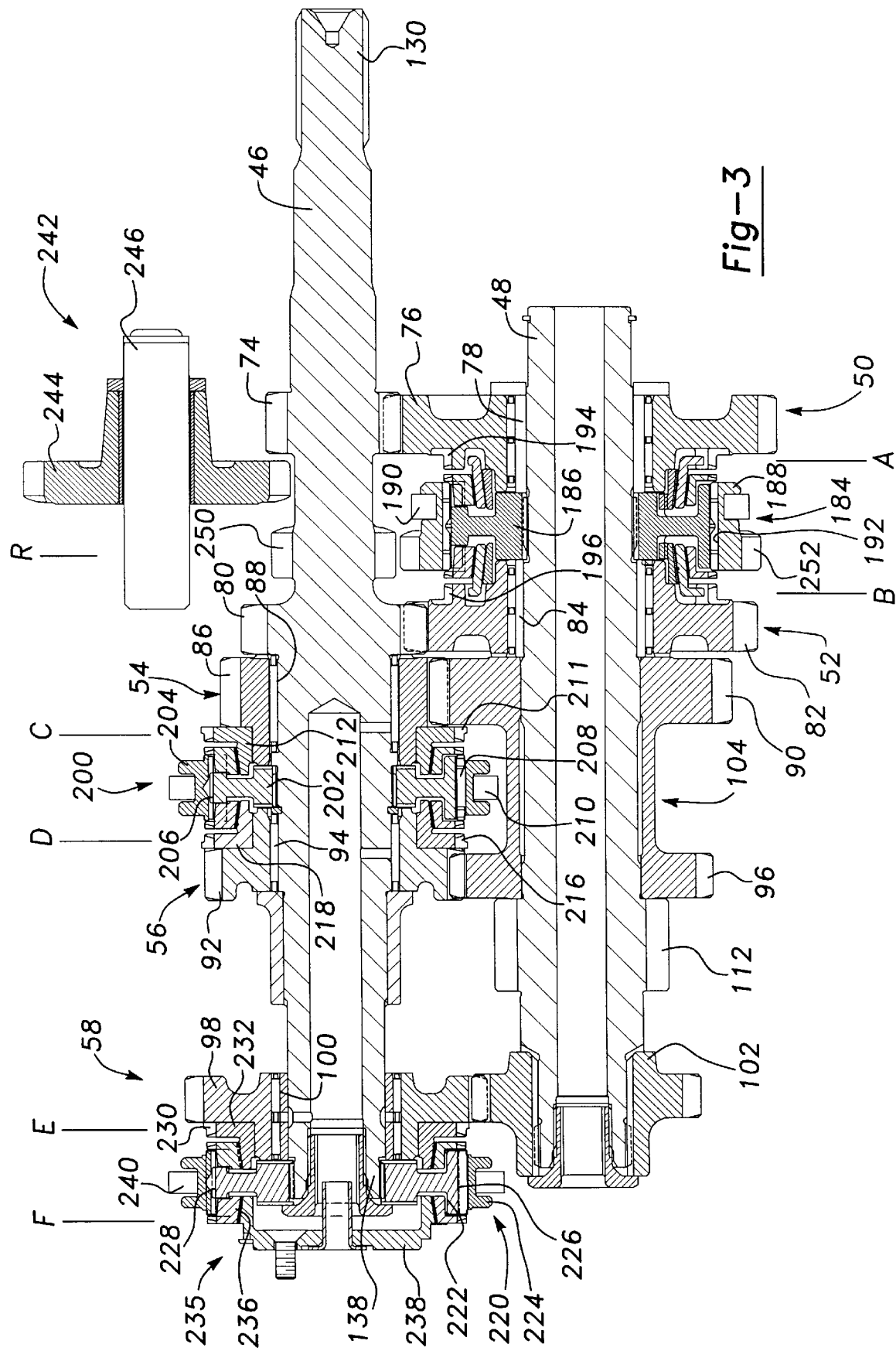
FIG. 3 is an enlarged partial view of FIG. 2 showing the geartrain components of the transmission in greater detail.

As best seen from FIGS. 2 and 3, first gearset 50 is shown to include a first input gear 74 that is secured to input shaft 46 and a first drive gear 76 that is rotatably mounted on mainshaft 48 via a suitable bearing assembly 78. First input gear 74 and first drive gear 76 are in constant-mesh so as to define a first power transmission path from input shaft 46 to mainshaft 48 at a first speed ratio. Second gearset 52 includes a second input gear 80 that is secured to input shaft 46 and a second drive gear 82 that is rotatably mounted on the mainshaft 48 via a suitable bearing assembly 84. Second input gear 80 and second drive gear 82 are in constant-mesh so as to define a second power transmission path from input shaft 46 to mainshaft 48 at a second speed ratio. Input gears 74 and 80 are shown formed integrally on input shaft 46. Conversely, input gears 74 and 80 could have been fixed (i.e., splined) to input shaft 46 for rotation therewith.

Third gearset 54 includes a third input gear 86 that is rotatably mounted on input shaft 46 via a suitable bearing assembly 88 and a third drive gear 90 that is secured to mainshaft 48. Third input gear 86 and third drive gear 90 are in constant-mesh so as to define a third power transmission path from input shaft 46 to mainshaft 48 at a third speed ratio. Fourth gearset 56 includes a fourth input gear 92 that is rotatably mounted on input shaft 46 via a suitable bearing assembly 94 and a fourth drive gear 96 that is secured to mainshaft 48. Fourth input gear 92 and fourth drive gear 96 are in constant-mesh so as to define a fourth power transmission path at a fourth speed ratio. Finally, fifth gearset 58 includes a fifth input gear 98 that is rotatably mounted on input shaft 46 via a suitable bearing assembly 100 and a fifth drive gear 102 that is secured to mainshaft 48. Fifth input gear 98 and fifth drive gear 102 are in constant-mesh so as to define a fifth power transmission path at a fifth speed ratio. Drive gears 90 and 96 are shown formed on a stubshaft 104 that is splined to mainshaft 48 for rotation therewith. Drive gear 102 is shown splined to mainshaft 48. Obviously, one, two, or all three of drive gears 90, 96, and 102 could have been formed integrally on mainshaft 48.

As noted, geartrain 42 is arranged to deliver drive torque at a selected speed ratio through one of the five forward power transmission paths from input shaft 46 to mainshaft 48. To provide means for delivering such drive torque from mainshaft 48 to transmission outputs 32 and 38, power transfer mechanism 44 includes synchronized range shift mechanism 62 which transfers drive torque through one of high-range gearset 64 and low-range gearset 66 to quill shaft 60. High-range gearset 64 includes third drive gear 90 which, as noted, is fixed to mainshaft 48, and a high-range drive gear 108 that is rotatably mounted on quill shaft 60 by a suitable bearing assembly 110. Third drive gear 90 and high-range drive gear 108 are in constant-mesh so as to define a high-range power transmission route from geartrain 42 to power transfer mechanism 44 having a high-range speed ratio. Thus, when high-range gearset 64 is selectively engaged, quill shaft 60 is driven by mainshaft 48 at the high-speed ratio.

Low-range gearset 66 includes a low-range input gear 112 that is secured to mainshaft 48 and a low-range drive gear 114 that is rotatably mounted on quill shaft 60 by a suitable bearing assembly 116. Low-range input gear 112 and low-range drive gear 114 are in constant-mesh so as to define a low-range power transmission route from geartrain section 42 to power distribution section 44 having a low-range speed ratio. Preferably, the low-range speed ratio is less than the high-range speed ratio. It is also contemplated that low-range drive gear 114 can be in constant mesh with fourth drive gear 96 instead of input gear 112 for providing a reduction in the axial length of transmission 20.

As best seen from FIG. 2, transmission 20 includes a housing assembly 118 having interconnected housing sections 120 and 122. Housing section 120 includes a bell housing portion 124 and an intermediate wall portion 126 which together define a clutch chamber 128. As is conventional, a releasable clutch (not shown) is housed in bell housing portion 124 and is coupled to first end 130 of input shaft 46. Housing section 120 also includes a gear housing portion 132 that defines an enlarged chamber 134 in which both geartrain 42 and power transfer mechanism 44 are mounted and which defines a common lubricating oil sump. Housing section 122 is mated with the open end of gear housing portion 132 by fasteners, such as bolts 136. First end 130 of input shaft 46 extends through an aperture 144 formed through intermediate wall portion 126 of housing section 120 and is rotatably supported therein by a suitable bearing assembly 146. A second end 138 of input shaft 46 extends through an aperture 150 formed in a support plate 152 that is shown fixed between housing sections 120 and 122, with second end 138 of input shaft 46 being supported for rotation therein by a suitable bearing assembly 154. As previously noted, mainshaft 48 is operatively arranged to transfer engine torque from input shaft 46 to quill shaft 60. Mainshaft 48 is rotatably supported at its first end 140 by a suitable bearing assembly 156. Likewise, mainshaft 48 is supported at its second end 142 by a suitable bearing assembly 158 that is retained in an aperture 160 formed in support plate 152. Quill shaft 60 is operatively arranged to selectively transfer engine torque from mainshaft 48 through one of high-range gearset 64 and low-range gearset 66 to interaxle differential 68. Quill shaft 60 is rotatably supported at its output end 162 by a suitable bearing assembly 164 which is fixed in an aperture 166 formed in support plate 152. Likewise, quill shaft 60 is supported at its input end 168 by a suitable bearing assembly 170 that is retained in an aperture 172 formed in a radial support plate 174. Support plate 174 is fixed within gear housing portion 132 by suitable fasteners, such as bolt 176.

With particular reference to FIG. 3, an enlarged portion of the sectional view shown in FIG. 2 is provided for illustrating geartrain 42 of transmission 20 in more detail. In general, each gearset 50, 52, 54, 56 and 58 is associated with a selectively engageable synchronizing clutch for shifting between the various gear ratios. To this end, a first synchronizer clutch assembly 184 is shown operably installed between first gearset 50 and second gearset 52 on mainshaft 48 and includes a hub 186 fixed for rotation with mainshaft 48 and a clutch sleeve 188 that is supported for rotation with and bi-directional axial movement on hub 186. First synchronizer clutch assembly 184 is preferably of the double-cone type, as shown. It is to be understood that synchronizer clutch assembly 184 (as well as each of the synchronizer clutch assemblies subsequently discussed for effecting gear changes between input shaft 46 and mainshaft 48) may be of any suitable type conventionally used in multi-speed manual transmissions.

When clutch sleeve 188 is moved from the centered neutral position shown to the position denoted by construction line "A", it couples first drive gear 76 to mainshaft 48, thus establishing the first power transmission path at the first speed ratio. Such movement of clutch sleeve 188 to its "A" position from its centered position causes speed synchronization between clutch sleeve 188 (and mainshaft 48) and first drive gear 76, thus allowing internal splines 192 on clutch sleeve 188 to move into driven engagement with clutch teeth 194 formed on first drive gear 76. Conversely, when clutch sleeve 188 is moved from the central neutral position to the position denoted by construction line "B", it couples second drive gear 82 to mainshaft 48, thus establishing the second power transmission path and the second speed ratio. Movement of clutch sleeve 188 to its "B" position from its centered position causes speed synchronization between clutch sleeve 188 (and mainshaft 48) and second drive gear 82, thus allowing internal splines 192 of clutch sleeve 188 to move into engagement with clutch teeth 196 formed on second drive gear 82. Clutch sleeve 188 is axially moveable relative to hub 186 in a well known manner by means of a first shift fork, partially shown at reference numeral 190, that is attached to a suitable gearshift mechanism (not shown). As is apparent, geartrain 42 of transmission 20 is a five-speed arrangement having three synchronized clutch assemblies that are manually shifted via the vehicle operator manipulating a gear shift lever and the clutch in a well-known manner.

A second synchronizer clutch assembly 200, preferably of the single-cone type, is shown operably installed on input shaft 46 between third gearset 54 and fourth gearset 56. Synchronizer clutch assembly 200 includes a hub 202 fixed (i.e., splined) for rotation with mainshaft 48 and a clutch sleeve 204 that is supported for rotation with and bi-directional axial movement on hub 202. When clutch sleeve 204 is moved from its centered neutral position shown to its third gear position, as denoted by line "C", it couples third input gear 86 (and third gearset 54) to input shaft 46, thus establishing the third power transmission path at the third speed ratio. Conversely, when clutch sleeve 204 is moved to its fourth gear position, as denoted by line "D", it couples fourth input gear 92 (and fourth gearset 56) to input shaft 46 for establishing the fourth power transmission path at the fourth speed ratio. Clutch sleeve 204 of second clutch assembly 200 has internal splines 206 meshed with external splines 208 formed on hub 202 for causing concurrent rotation therewith. Clutch sleeve 204 is axially movable between its "C" and "D" positions by means of a second shift fork, partially shown at 210, that is also coupled to the gearshift mechanism. Clutch teeth 211 are formed on a gear hub 212 that is fixed to third input gear 86 and are selectively engageable with splines 206 on clutch sleeve 204 when, following synchronization, clutch sleeve 204 is moved to its "C" position for coupling third input gear 86 to input shaft 46. Similarly, clutch teeth 216 are formed on a gear hub 218 that is fixed to fourth input gear 92 and are selectively engageable with splines 206 on clutch sleeve 204 when, following synchronization, clutch sleeve 204 is moved to its "D" position for coupling fourth input gear 92 to input shaft 42.

A third synchronizer clutch assembly 220, also preferably of the single-cone type, includes a hub 222 that is splined for rotation on second end 138 of input shaft 46. A third clutch sleeve 224 has internal splines 226 meshed for rotation with and axial movement on external spline teeth 228 formed on hub 222. Splines 226 on clutch sleeve 224 selectively engage clutch teeth 230 formed on a gear hub 232 that is fixed to fifth input gear 98 when clutch sleeve 224 is moved, following synchronization, to its "E" position for interconnecting fifth gearset 58 to input shaft 46 so as to establish the fifth power transmission path at the fifth speed ratio. Clutch sleeve 224 is moved to its "F" position in response to shifting of geartrain 42 into its Reverse drive mode for effectively stopping rotation of input shaft 42 to inhibit inertia-related gear clash. To this end, transmission 20 includes a reverse brake mechanism 235 having a brake cone 236 that is frictionally mounted on a conical surface of a brake plate 238 which, in turn, is non-rotatably fixed to housing section 122. Movement of clutch sleeve 224 toward its "F" position causes speed synchronization between input shaft 46 and housing section 122, thereby braking rotation of input shaft 46. Clutch sleeve 274 is axially moveable between its "E" and "F" positions by means of a third shift fork, partially shown at 240, that is also connected to the gearshift mechanism.

Geartrain 42 includes a reverse assembly 242 having a reverse idler gear 244 slidably and rotatably mounted on a shaft 246. Shaft 246 has a first end secured to support plate 174 and its opposite end retained in a bore formed in intermediate wall portion 126. Reverse idler gear 244 is shown in its non-engaged position where further or excess forward movement is limited by engagement with wall portion 126. In the illustrated non-engaged position, reverse idler gear 244 is located between first input gear 74 and a reverse input gear 250 that is fixed to input shaft 46. When clutch sleeve 224 of third synchronizer clutch assembly 222 is moved to its braked position ("F"), reverse idler gear 244 is moved from its non-engaged position to a Reverse position (R), as shown in phantom in FIG. 2, whereat it meshes with reverse input gear 250 and a reverse output gear (not shown) that, in turn, is meshed with a reverse drive gear 252 fixed on or integral with first clutch sleeve 188. Rotation of reverse drive gear 252 causes concurrent rotation of clutch sleeve 188 and hub 186 which, in turn, rotates mainshaft 48. Obviously, first clutch sleeve 188 is in its neutral centered position when such a reverse shift is attempted. Excess movement of reverse idler gear 244 beyond its Reverse position (R) is limited by engagement with support plate 174.

With reference now to FIGS. 4 through 7, power transfer mechanism 44 of transmission 20 is shown for the purpose of illustrating the power transmission routes to outputs 32 and 38 from geartrain 42. In general, FIGS. 4 through 7 illustrate the power transmission routes through power transfer mechanism 44 of transmission 20 for establishing full-time and part-time four-wheel drive modes, and a two-wheel drive mode, all at both the high and low speed ranges. Specifically, these drawings illustrate the power transmission routes taken from mainshaft 48 through quill shaft 60 and interaxle differential 68 to front output 32 and rear output 38. In the construction shown, rear output 38 is a rear output shaft 256 that is adapted to be coupled to rear prop shaft 40. Likewise, front output 32 is a front output shaft 258 about which quill shaft 60 is journally supported and which is selectively engageable with front prop shaft 34 via mode select mechanism 72.

With continued reference to FIGS. 4 through 7, synchronized range shift mechanism 62 is shown to include a bi-directional dual-cone synchronizer clutch assembly 260 having a hub 262 fixed to quill shaft 60 for rotation therewith and which is located between high-range drive gear 108 and low-range drive gear 114. Hub 262 includes external splines 264 which are adapted to slidingly receive internal splines 266 formed on a range collar 268. Thus, range collar 268 is rotatable with and axially moveable relative to hub 262 in a well known manner by means of a range fork, partially shown at 270. Preferably, range fork 270 is supported for movement on or with a range shaft (not shown). More preferably, movement of range fork 270 is controlled by a shift apparatus having a rotatable sector plate which can be selectively rotated for moving range fork 270 between its high and low speed range positions. The shift apparatus can be a manually-operated mechanical system coupling the rotatable sector plate to a shift lever, or an electronically-controlled arrangement wherein an actuator rotates the sector plate in response to the vehicle operator energizing a suitable switch. An exemplary sector-type shift apparatus which could be modified by skilled artisans for application to this invention is disclosed in commonly owned U.S. Pat. No. 5,159,847 entitled "SECTOR PLATE FOR TRANSFER CASE" the disclosure of which is hereby incorporated by reference.

Axial movement of range collar 268 from its central non-actuated Neutral mode position ("N") to its High-range position ("HI") results in speed synchronization between quill shaft 60 and high-range drive gear 108 which is driven by mainshaft 48 through third drive gear 90. Following synchronization, internal splines 266 on range collar 268 can move into meshed engagement with clutch teeth 272 formed on a clutch ring 273 that is fixed for rotation with high-range drive gear 108. Conversely, axial movement of range clutch collar 268 from its Neutral position ("N") toward its low-range position ("LO") results in speed synchronization between quill shaft 60 and low-range drive gear 114, thus allowing internal splines 266 of range collar 268 to move into meshed engagement with clutch teeth 274 formed on a clutch ring 276 fixed for rotation with low-range drive gear 114. Accordingly, range shift mechanism 62 permits the vehicle operator to shift "on-the-fly" between the high and low speed ranges. However, in most applications, the ability to shift from high to low on-the-fly will be limited to low vehicular speed conditions to avoid sudden and undesirable jerking. Such shift limitations can be predicated on the synchronizing torque capacity of synchronizer clutch 260 or via any other known shift inhibiting device. In its Neutral mode position ("N"), no drive torque is transferred from geartrain 42 to power transfer mechanism 44 since quill shaft 60 is de-coupled from mainshaft 46. As noted, movement of range clutch collar 268 can be controlled either manually (via a suitable mechanical shift apparatus) or electrically (via a suitable actuator controlled by a pushbutton) based on the particular vehicular application.

With respect to the remainder of the power transmission route through power transfer mechanism 44, quill shaft 60 is coupled to differential 68 for transferring drive torque thereto. Based on the preferred construction shown, differential 68 is a planetary gearset having an input planet carrier 280, an output sun gear 282 coupled (i.e., splined) to front output shaft 258, and an output ring gear 284 operable coupled to rear output shaft 256. Planet carrier 280 includes a pair of laterally-spaced carrier rings 279 and 281, and a plurality of pinion gears 286 journally supported on pins 283 between the carrier rings which constantly mesh with both sun gear 282 and ring gear 284. In particular, forward end 162 of quill shaft 60 is splined to a tubular extension 302 of carrier ring 279 for directly driving planet carrier 280. Sun gear 282 is splined to a first end 288 of front output shaft 258. Ring gear 284 is integrally mated with a cylindrical drum 290 which, in turn, is coupled to an annular collar 292. In particular, collar 292 has a radial segment 294 connected to drum 290 and a hub segment 296 splined to rear output shaft 256. Collar 292 is supported in housing section 122 by a suitable bearing assembly 298.

Figure 4:
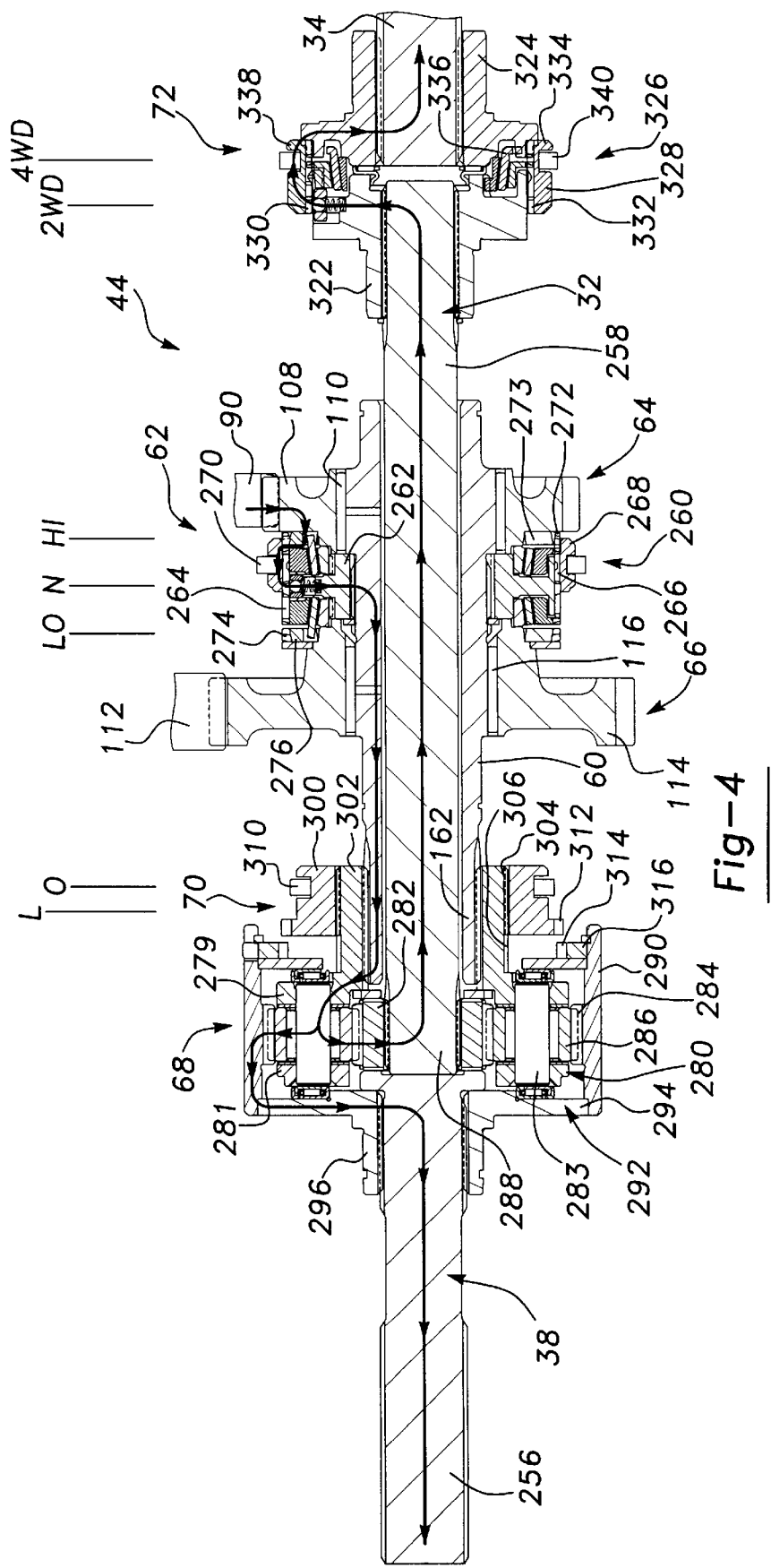
FIG. 4 illustrates a power transmission route through the power transfer mechanism of the transmission for establishing a full-time four-wheel high-range drive mode.
Figure 5:
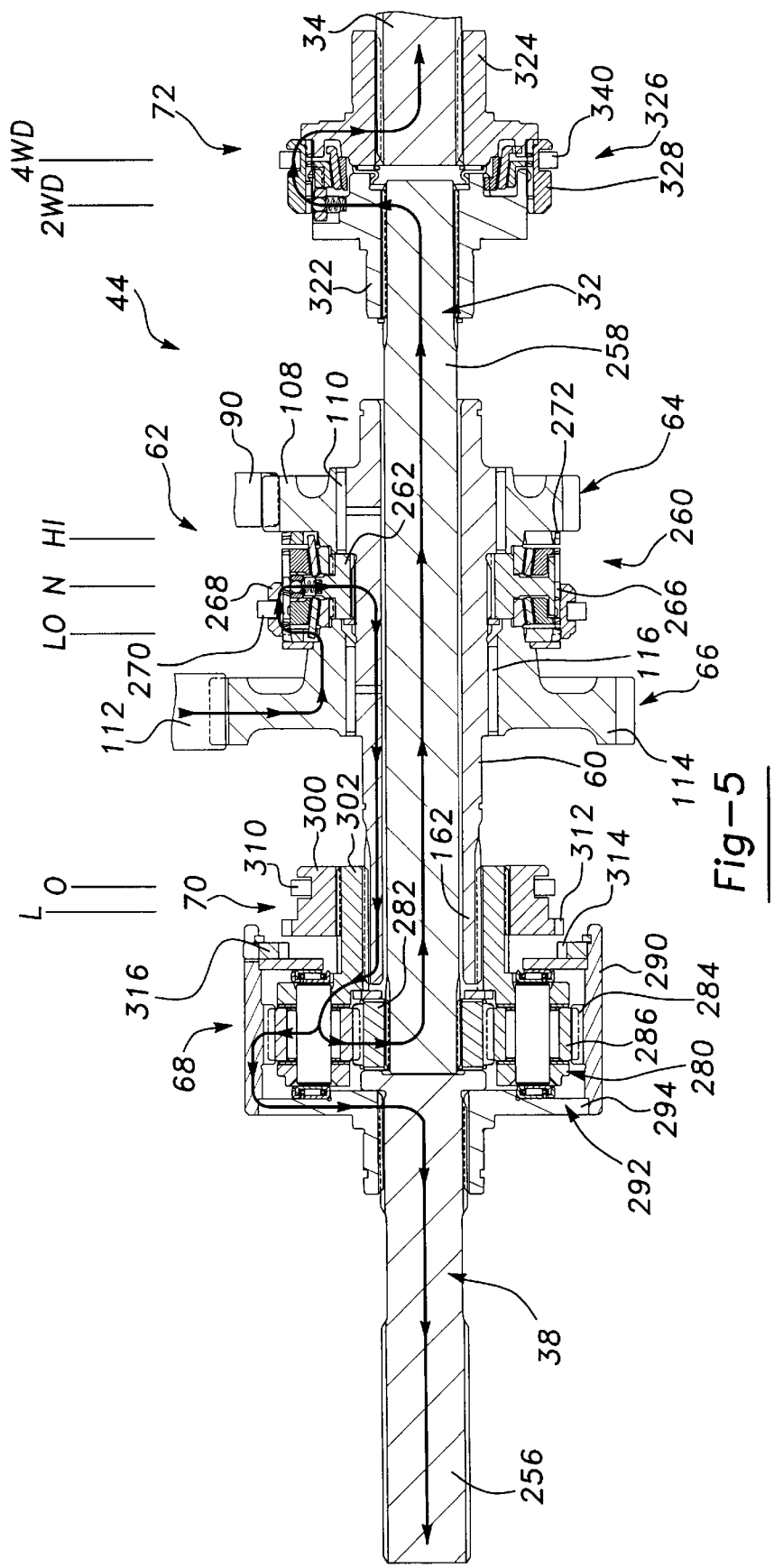
FIG. 5 is a view, similar to that of FIG. 4, showing a power transmission route through the power transfer mechanism of the transmission for establishing a full-time four-wheel low-range drive mode.

In FIGS. 4 and 5, interaxle differential 68 is shown in an "open" operating state such that speed differentiation between ring gear 284 and sun gear 282 is permitted to accommodate interaxle rotational speed differences between front driveline 12 and rear driveline 14. Moreover, the torque split ratio delivered between front output shaft 258 and rear output shaft 256 is based on the planetary gear geometry of the intermeshed components of interaxle differential 68, as is known in the differential art. To provide means for locking differential 68 in a "locked" state for inhibiting speed differentiation, lock-out mechanism 70 is shown to include a lock-out collar 300 splined for rotation with and axial sliding movement on tubular extension 302 of carrier ring 279 by means of collar internal splines 304 engaging external splines 306 formed on the outer peripheral of extension 302. Lock-out collar 300 is axially movable by means of engagement with a shift fork, partially shown at 310, which, in turn, is also coupled to the shift apparatus. Lock-out collar 300 has external clutch teeth 312 that are meshingly engageable with internal clutch teeth 314 formed on a clutch ring 316 that is fixed to drum 290.

Figure 6:
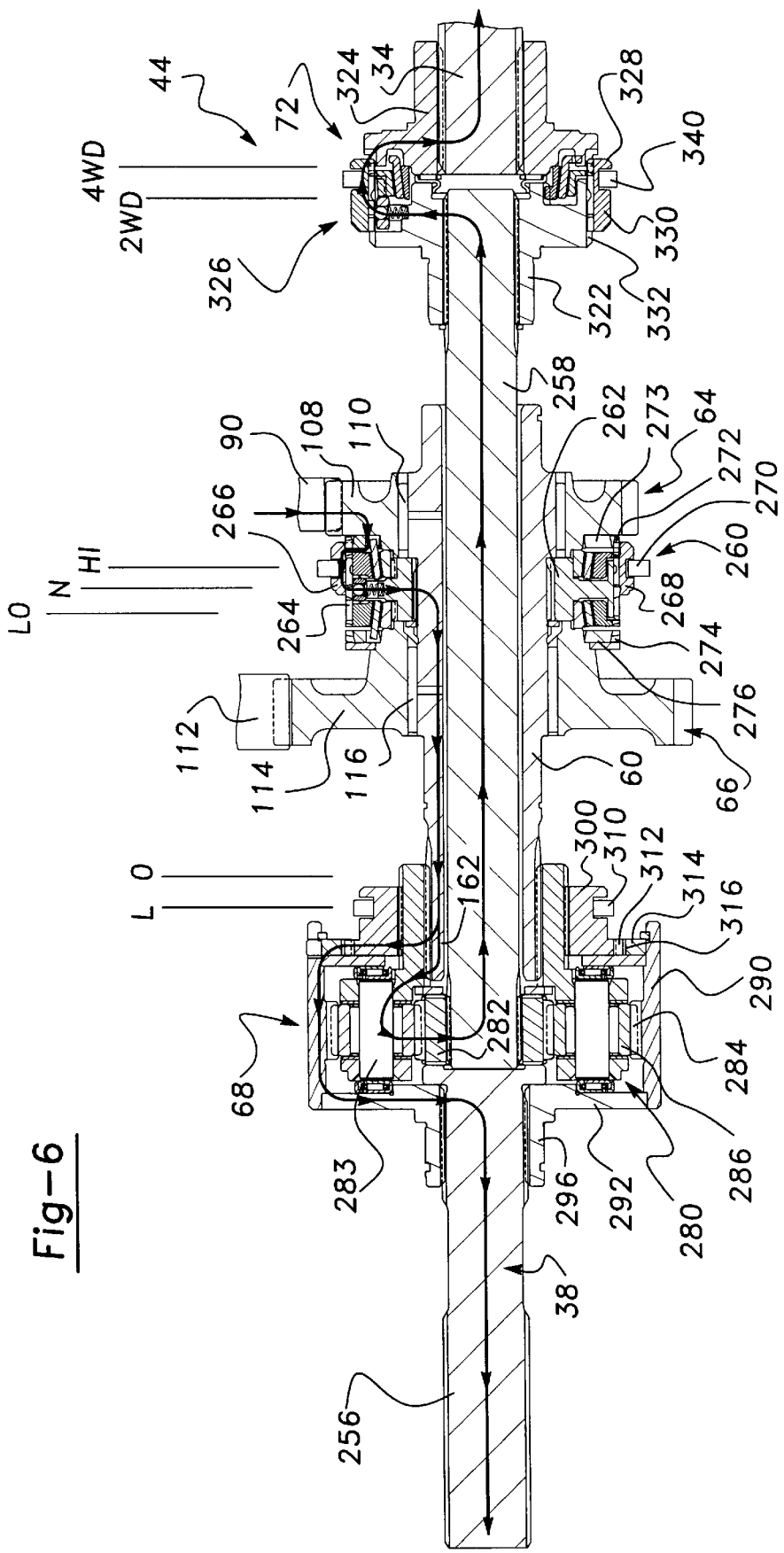
FIG. 6 illustrates a power transmission route through the power transfer mechanism of the transmission for establishing a part-time four-wheel high-range drive mode.

In FIGS. 4 and 5, lock-out collar 300 is shown positioned in its Open position ("O") whereat clutch teeth 312 are disengaged from clutch teeth 314 such that interaxle differential 68 operates in its "Open" state for establishing full-time four-wheel drive. That is, differential 68 splits the torque delivered by quill shaft 60 at a predetermined ratio between front output shaft 258 and rear output shaft 256 while permitting speed differentiation therebetween. In FIGS. 2, 6 and 7, lock-out collar 300 is shown position in its Locked position ("L") whereat clutch teeth 312 are meshed with clutch teeth 314 such that interaxle differential 68 operates in its "Locked" state for establishing part-time four-wheel drive. In this position, ring gear 284 (and rear output shaft 256) is directly coupled for rotation with planet carrier 280 and quill shaft 68, thereby inhibiting speed differentiation between front output shaft 258 and rear output shaft 256.

While the arrows in FIG. 4 illustrates the power flow path through transmission 20 for establishing the full-time high-range four-wheel drive mode and FIG. 5 illustrates the power flow path establishing the full-time low-range four-wheel drive mode, each of these modes may be selectively changed from the illustrated full-time four-wheel mode to a corresponding part-time four-wheel mode. This change is made by actuating lock-out mechanism 70 to move lock-out collar 300 from the Open ("O") position to its Locked ("L") position for locking-out differential 68. In this differential locked-out condition, part-time four-wheel drive is established because interaxle differentiation is prohibited. Thus, in both high-range and low-range, the four-wheel drive mode may be selected to be either full-time or part-time. Moreover, while lock-out mechanism 70 is illustrated as a dog clutch type arrangement, it is contemplated that a synchronizing-type clutch assembly could be used for facilitating shifting from full-time to part-time four-wheel operation "on-the-fly" without stopping the vehicle. Alternatively, lock-out mechanism 70 could be replaced with a slip limiting device such as, for example, a viscous coupling for automatically and progressively inhibiting differentiation across differential 68 when such interaxle speed differentiation becomes excessive. As a further alternative, an electrically-controlled friction clutch can be used to apply a braking torque between the two outputs of interaxle differential 68 for limiting slip therebetween. In such a system, the braking torque could be controlled in various manners (i.e., ON/OFF, modulated, etc.) in response to the magnitude of the interaxle slip.

As an additional feature, transmission 20 may also be shifted "on-the-fly" between the four-wheel drive (full-time or part-time) modes and two-wheel drive modes. To this end, mode select mechanism 72 provides a means for selectively coupling and uncoupling front output shaft 258 to front prop shaft 34. In particular, mode select mechanism 72 includes a first hub 322 fixed for rotation with front output shaft 258, a second hub 324 fixed for rotation with front prop shaft 34, and a synchronizer clutch assembly 326 therebetween. Synchronizer clutch assembly 326 is a dual-cone type and includes a mode collar 328 having internal splines 330 retained for rotation with and axial sliding movement on external splines 332 formed on first hub 322. A blocker ring 334 and a friction cone 336 are interposed between mode clutch collar 328 and second hub 324 in a well known manner such that movement of mode collar 328 from its 2WD position (FIG. 7) toward its 4WD position (FIGS. 4, 5 and 6) causes speed synchronization to occur between front output shaft 258 and front prop shaft 34. Once synchronization is complete, splines 330 on mode collar 328 meshingly engage clutch teeth 338 on second hub 324, thereby directly coupling front output shaft 258 to front prop shaft 34. Movement of mode collar 328 is effectuated by a mode fork, partially shown at 340, which is likewise connected to the shift apparatus. When operation of transmission 20 in the two-wheel drive mode (either high-range or low-range) is desired, differential lock-out mechanism 70 is actuated in coordination with movement of mode collar 328 to its 2WD position to cause lock-out collar 300 to move to its Locked ("L") position.

Since geartrain 42 of transmission 20 is shown as a manually-operated five-speed arrangement, it will be clear that any suitable gearshift mechanism can be utilized for controlling the coordinated movement of shift forks 190, 210 and 240 so as to permit the vehicle operator to select a desired speed ratio via movement of a gearshift lever. In addition, it is contemplated that the above-noted shift apparatus can be utilized to control the coordinated movement of range collar 268, mode collar 328, and lock-out collar 300 for permitting the vehicle operator to select a desired drive mode. As set forth in the table shown at FIG. 8, transmission 20 is capable of permitting the vehicle operator to select any one of a two-wheel high-range drive mode, a two-wheel low-range drive mode, a full-time high-range four-wheel drive mode, a full-time low-range four-wheel drive mode, a part-time high-range four-wheel drive mode, a part-time low-range four-wheel drive mode, and a neutral mode. As noted, the shift apparatus associated with power transfer mechanism 44 can be a manually-operated mechanical system controlled by a gearshift lever or can be a electronically-controlled system of actuators arranged to move the various shift collars.

While transmission 20 has been described above in a preferred embodiment as integrating both a planetary-type interaxle differential 68 and mode select mechanism 72 for disengaging front output shaft 258 from front driveline 12, it must be understood that either one of these features or neither one of these features may be included in transmission 20.

Figure 9:
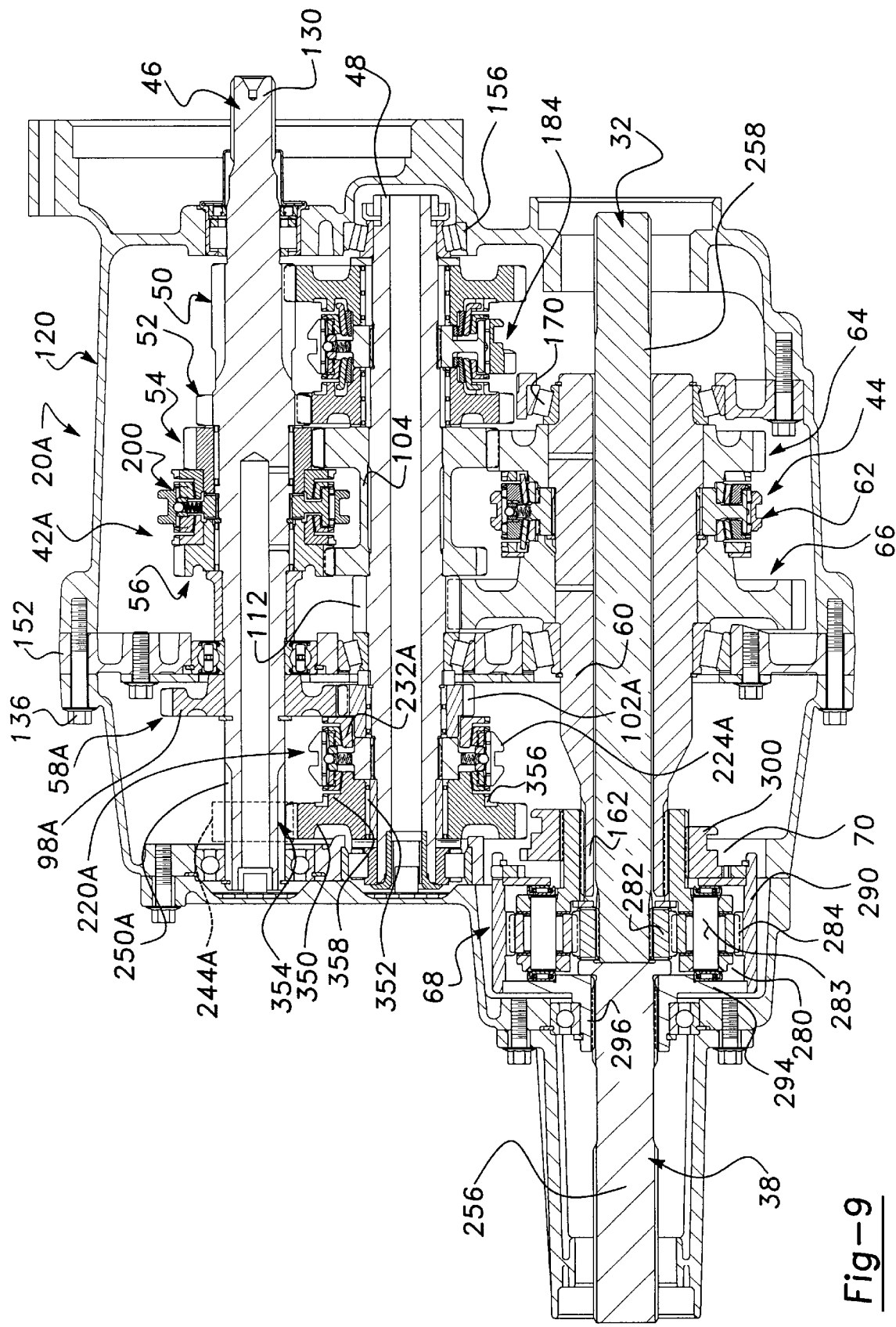
FIG. 9 is a sectional view of the transmission having the geartrain modified to include a synchronized reverse gear assembly.

Referring now to FIG. 9, a modified version of transmission 20 is identified by reference numeral 20A with its components which are similar in structure and/or function to those previously described being components identified by common reference numerals. In general, transmission 20A has a geartrain 42a which provides a synchronized reverse gear in addition to five synchronized forward gears. In particular, fifth gearset 58A includes a fifth input gear 98A which is fixed to input shaft 46 while a fifth drive gear 102A is rotatably mounted by bearing assembly 100A on mainshaft 48. A third synchronizer clutch assembly 220A is shown disposed about mainshaft 48 between fifth drive gear 102A and a reverse drive gear 350 which is rotatably mounted by bearing assembly 352 on mainshaft 48. Third synchronizer clutch assembly 220A includes a hub 222A splined for rotation on mainshaft 48 and a third clutch sleeve 224A splined for rotation with and axial movement on hub 222A. A reverse input gear 250A is integrally formed on input shaft 46 but does not engage reverse drive gear 350. A reverse idler gear 244A (shown in phantom) is maintained in constant-mesh with both reverse input gear 250A and reverse drive gear 350, thereby defining a constant-mesh reverse gearset 354. Movement of third clutch sleeve 224A from its centered neutral position shown to the right causes clutch sleeve 224A to engage Clutch teeth 230A formed on a gear hub 232A fixed on fifth drive gear 102A for connecting fifth gearset 58A to mainshaft 48 and establishing the fifth power transmission path. Clutch sleeve 224A is moved from its neutral position to the left for shifting geartrain 42A into its reverse drive mode. Specifically, synchronizer clutch assembly 220A is bi-directional such that movement of clutch sleeve 224A to the left synchronizes the rotary speed of reverse drive gear 350 relative to mainshaft 48 prior to its meshed engagement with clutch teeth 356 of a gear hub 358 integrally formed on reverse drive gear 350. Thus, synchronizer clutch assembly 220A functions to connect reverse gearset 354 to mainshaft 48 for establishing the reverse power transmission path. As such, reverse brake mechanism 235 and reverse assembly 242 associated with transmission 20 are replaced with a direct synchromesh unit.

Figure 10:
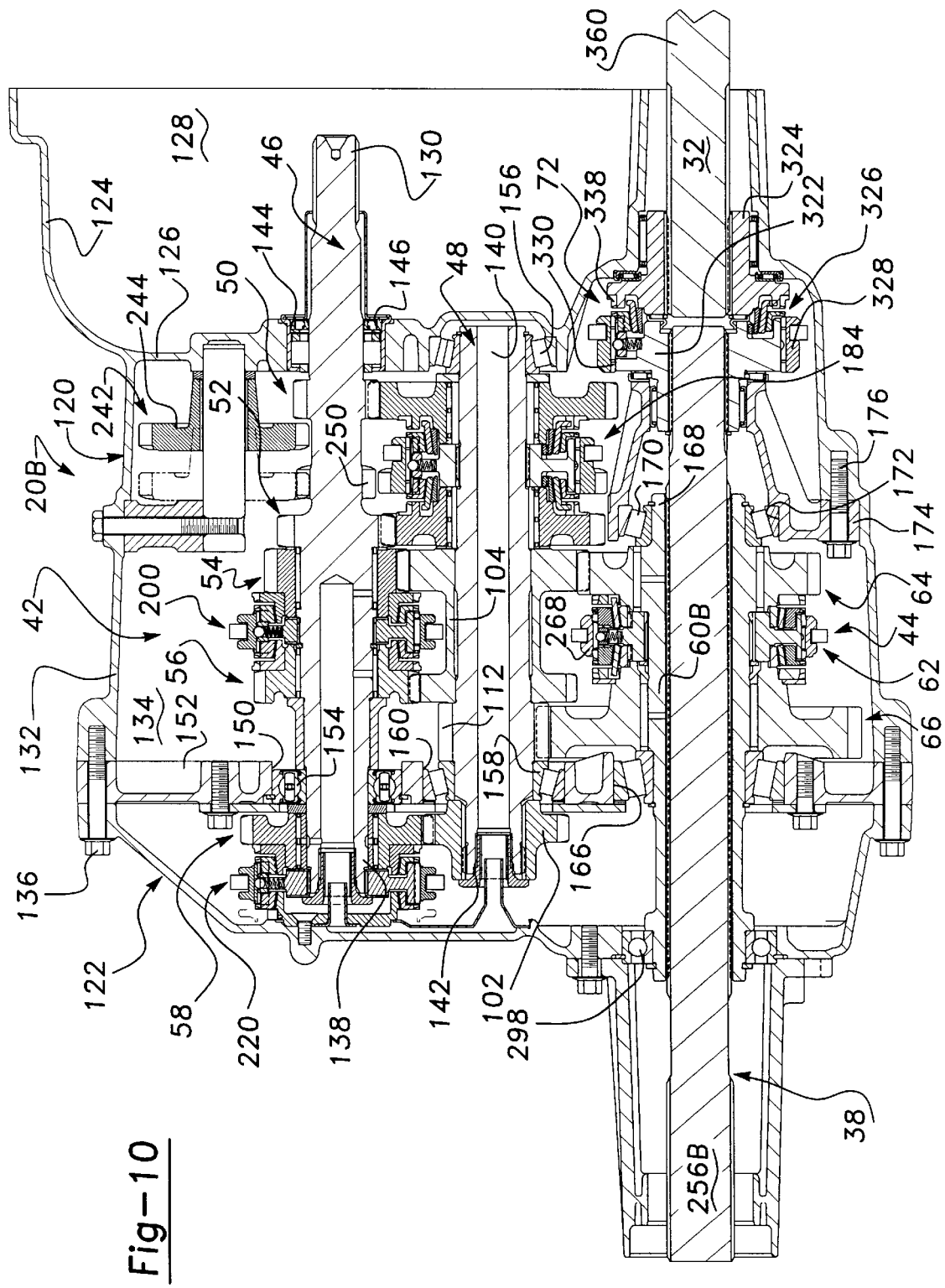
FIG. 10 is a sectional view of the transmission constructed according to an alternative embodiment of the present invention.

Referring now to FIG. 10, a transmission 20B is shown having many of the components of transmission 20 with the exception that a part-time two-speed power transfer mechanism 44B is provided. Power transfer mechanism 44B is capable of establishing a two-wheel drive mode and a part-time four-wheel drive mode, each at both the high and low speed ranges, as well as a neutral mode. Specifically, a quill sleeve 60B is shown fixed (i.e., splined) to a rear output shaft 256B with synchronized range shift mechanism 62 operable for selectively coupling quill shaft 60B to mainshaft 48 through either of high-range gearset 64 or low-range gearset 66. In a manner identical to that previously described, range collar 268 can be moved between its Neutral mode ("N"), High-Range mode ("HI"), and Low-Range mode ("LO") positions to provide on-the-fly shifting between the high and low speed ranges. Transmission 20B is also shown to include a synchronized mode select mechanism 72B for providing on-the-fly shifting between the four-wheel drive and two-wheel drive modes. To this end, first hub 322 is fixed for rotation with rear output shaft 256B while second hub 324 is fixed for rotation with a front yoke shaft 360 which, in turn, is fixed to front prop shaft 34. Synchronizer clutch assembly 326 is substantially identical to that previously described with mode collar 328 movable between the 2WD position shown and the 4WD position. In the 2WD position, spline teeth 330 of mode collar 328 are disengaged from clutch teeth 338 on second hub 324 such that all drive torque delivered to quill shaft 60B is transferred to rear output shaft 256B, thereby establishing the two-wheel drive mode. In the 4WD position, mode collar spline teeth 330 are in meshed engagement with clutch teeth 338 on second hub 324, whereby drive torque is transferred from rear output shaft 256B to front yoke shaft 360. Since front yoke shaft 360 is rigidly connected to rear output shaft 256B, the part-time four-wheel drive mode is established at both of the available high and low speed ranges. As a contemplated alternative to the above arrangement, quill sleeve 60B can be fixed for rotation with front yoke shaft 360 with the synchronized mode select mechanism arranged to selectively couple rear output shaft 256B to front yoke shaft 360 when the four-wheel drive mode is selected.

Figure 11:
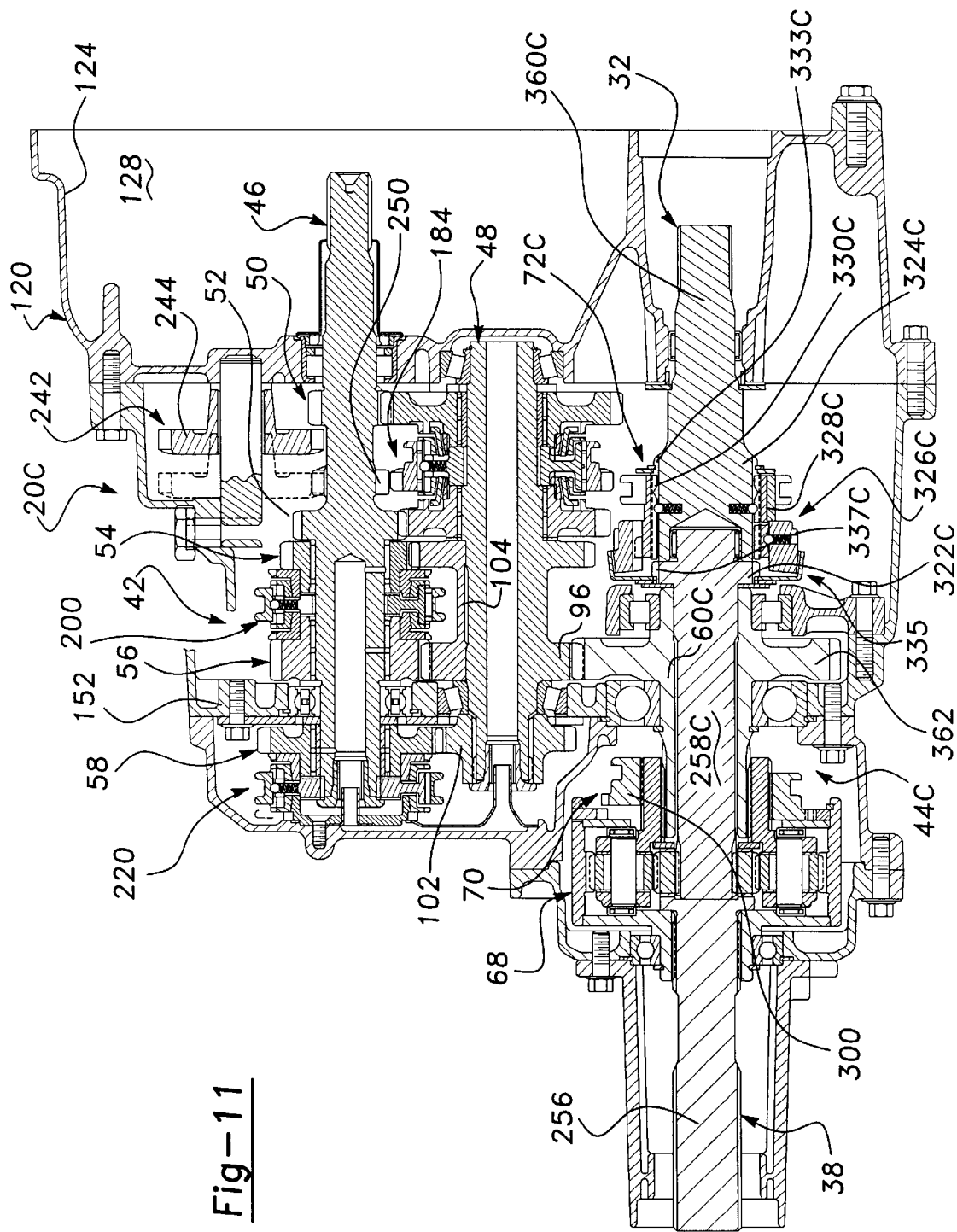
FIG. 11 is a sectional view of the transmission constructed according to another alternative embodiment of the present invention.

With reference now to FIG. 11, transmission 20C is shown which is generally similar to transmission 20 of FIG. 2 with the exception that range shift mechanism 62 has been removed. Thus, power transfer mechanism 44C is a full-time single speed arrangement which is equipped with interaxle differential 68, lock-out mechanism 70 and a synchronized mode select mechanism 72C. Moreover, geartrain 42 is substantially similar to that previously described with reference to transmission 20 of FIG. 2 and, as such, further description is not required. However, the synchronized reverse gear arrangement shown for geartrain 42A of transmission 20A in FIG. 9 can also be used in transmission 20C.

Power transfer mechanism 44C includes a quill shaft 60C journally supported on front output shaft 258C and on which a transfer gear 362 is shown integrally formed. Transfer gear 360 is in constant meshed engagement with fourth drive gear 96 of fourth gearset 56 for continuously transferring drive torque from mainshaft 48 to quill shaft 60C and, thus, to the input of interaxle differential 68 at a predetermined transfer speed ratio. As is known, the transfer speed ratio is dependent on the ratio of gear teeth associated with transfer gear 362 and fourth drive gear 96 and may be selected to meet the particular requirements of the vehicular application. Transfer gear 362 may, alternatively, be meshed with any of the other drive gears associated with mainshaft 48. Thus, power transfer mechanism 44C is capable of establishing three different drive modes, namely, a full-time four-wheel drive mode, a part-time four-wheel drive mode, and a two-wheel drive mode. Since quill shaft 60C is driven in response to rotation of mainshaft 48, a neutral mode is available through geartrain 42.

Mode select mechanism 72C is a different arrangement than that shown previously but still functions to provide synchronized on-the-fly shifting between the two-wheel drive mode and the four-wheel drive mode. Mode select mechanism 72C includes a first hub 322C integrally formed on front output shaft 258C, a second hub 324C integrally formed on front yoke shaft 360C which is fixed to front propshaft 34, and a synchronizer clutch assembly 326C therebetween. Synchronizer clutch assembly 326C includes a mode collar 328C with internal splines 330C meshed with external splines 333C formed on second hub 324C. Additionally, a friction cone-type synchronizer assembly 335 is interposed between first hub 322C and mode collar 328C such that movement of mode collar 328C from its 2WD position toward its 4WD position causes speed synchronization to occur between front output shaft 258C and front yoke shaft 360C. Upon completion of speed synchronization, splines 330C on mode collar 328C move into meshed engagement with clutch teeth 337C on first hub 322C, thereby directly coupling front output shaft 258C to front yoke shaft 360C.

When operation of transmission 20C in the full-time four-wheel drive mode is desired, lock-out collar 300 is located in its Open ("O") position and mode collar 328C is located in its 4WD position. To provide the part-time four-wheel drive mode, lock-out collar 300 is located in its Locked ("L") position while mode collar 32C is located in its 4WD position. Finally, when operation in the two-wheel drive mode is desired, lock-out collar 300 is moved to its ("L") position while mode collar 328C is moved to its 2WD position.

Figure 12:
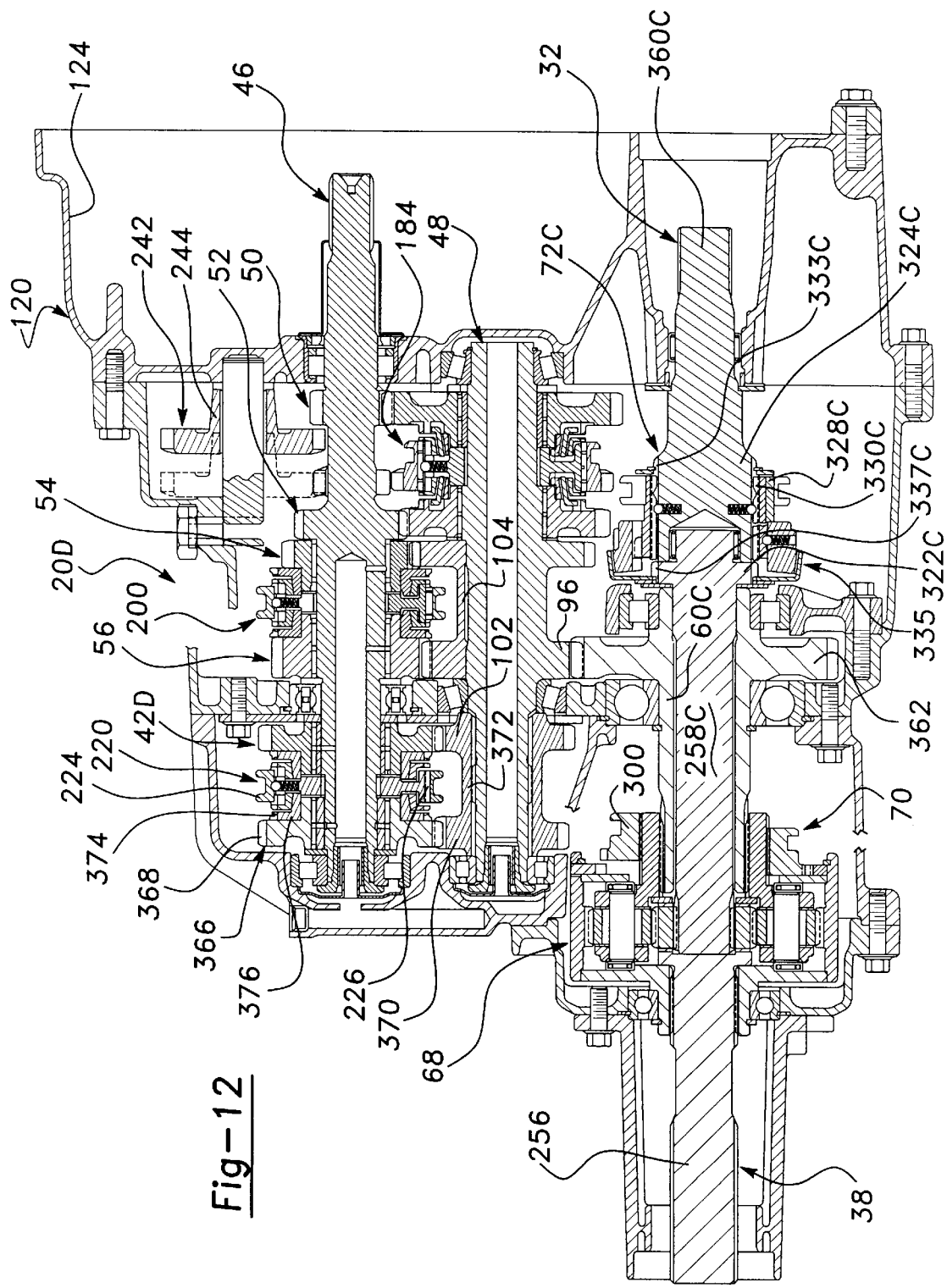
FIG. 12 is a sectional view of a transmission similar to that shown in FIG. 11 but having a modified geartrain.

Referring to FIG. 12, a six-speed version of transmission 20C is shown and identified by reference numeral 20D. Basically, transmission 20D is equipped with a modified geartrain 42D which includes a sixth gearset 366 having a sixth input gear 368 rotatably supported on input shaft 46 and a sixth drive gear 370 fixed to mainshaft 48. Sixth input gear 368 is in constant-mesh with sixth drive gear 370 so as to define a sixth power transmission path at a sixth speed ratio. Fifth and sixth drive gears 370 and 102, respectively, are shown formed on a stub shaft 372 splined to mainshaft 48. Third synchronizer clutch 220 is interposed between fifth input gear 98 and sixth input gear 368. In a manner similar to that shown in FIG. 3, movement of third clutch sleeve 224 to its "E" position interconnects fifth gearset 58 to input shaft 46 for establishing the fifth forward speed ratio. Movement of clutch sleeve 224 to its "F" position interconnects sixth gearset 366 to input shaft 46 to establish the sixth forward speed ratio. In particular, spline teeth 226 on clutch sleeve 224 engage clutch teeth 374 on a gear hub 376 which is fixed to sixth input gear 368. As seen, reverse assembly 242 is associated with geartrain 42D of transmission 20D.

Figure 13:
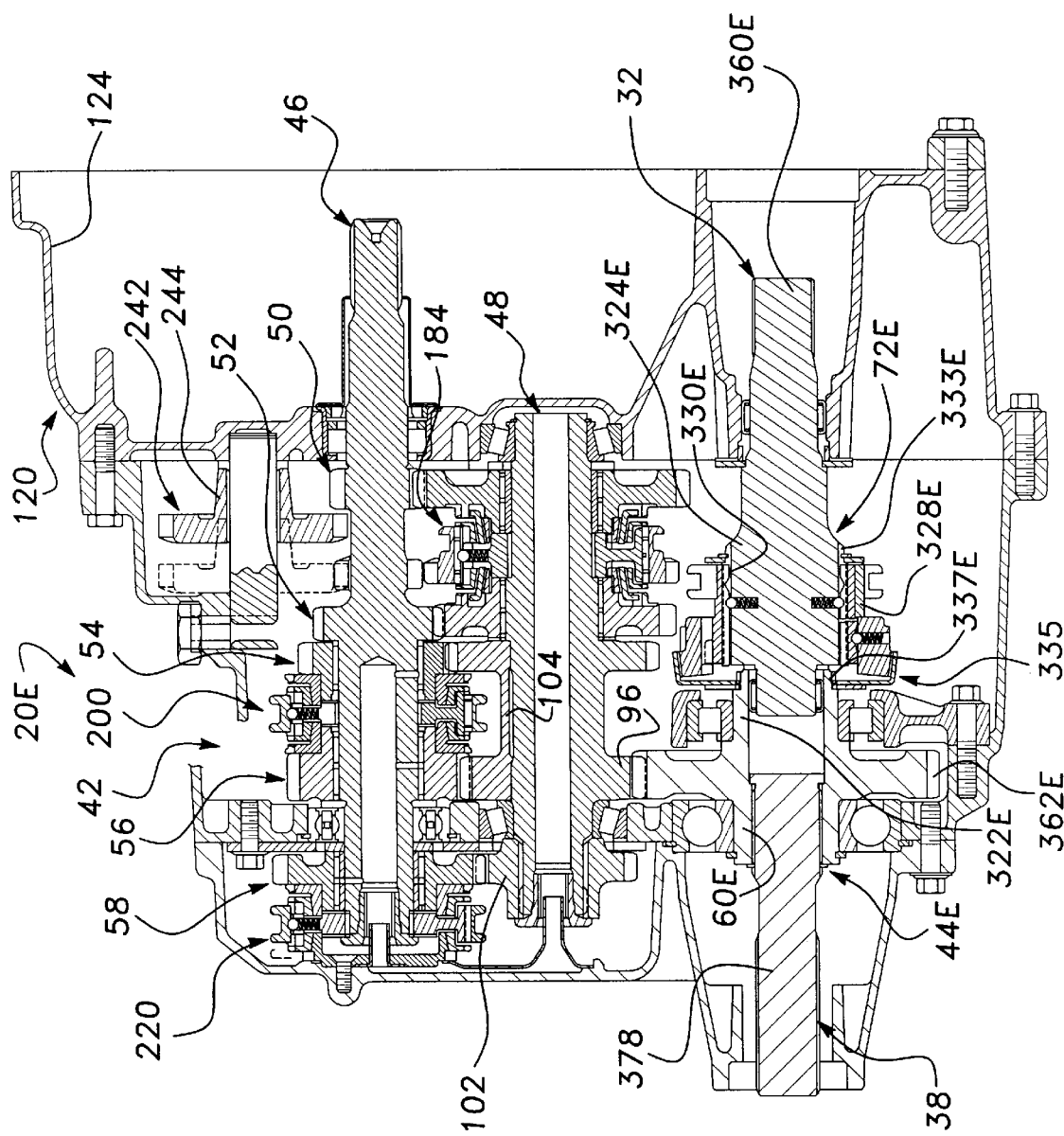
FIG. 13 is a sectional view of the transmission according to yet another alternative embodiment of the present invention.

Referring now to FIG. 13, a further modified version of transmission 20C, hereinafter identified by reference numeral 20E, is shown in which interaxle differential 68 and lock-out mechanism 70 have been removed to define a part-time single-speed power transfer mechanism 44E. In particular, power transfer mechanism 44E includes a transfer gear 362E formed integrally with quill shaft 60E and which is in constant meshed engagement with fourth drive gear 96 of fourth gearset 56. Quill shaft 60E is fixed (i.e., splined) to a rear yoke shaft 378 such that drive torque delivered through geartrain 42 to mainshaft 48 is delivered to rear yoke shaft 378 at a transfer speed ratio determined by the gear teeth ratio between transfer gear 362E and fourth drive gear 96. Rear yoke shaft 378 is adapted to be suitably coupled to rear propshaft 40. Mode select mechanism 72E is generally similar in construction to mode select mechanism 72C of FIG. 11 with the exception that first hub 322E is integrally formed on quill shaft 60E. Thus, mode collar 328E is movable on second hub 324E formed on front yoke shaft 360E from its 2WD position to its 4WD position whereat collar splines 330E engage clutch teeth 337E on first hub 322E. Thus, in its 4WD position, mode collar 328E directly couples quill shaft 60E to front yoke shaft 360E, thereby rigidly coupling front propshaft 34 for common rotation with rear prop shaft 40 to define the part-time four-wheel drive mode. In its 2WD position, mode collar 328E is disengaged from clutch teeth 337E on quill shaft 60E, whereby all drive torque is delivered to rear yoke shaft 378 for establishing the two-wheel drive mode. Again, the arrangement could be modified to transfer drive torque from quill shaft 60E to front yoke shaft 360E and to selectively couple front yoke shaft 378 thereto for establishing the four-wheel drive mode.

Figure 14:
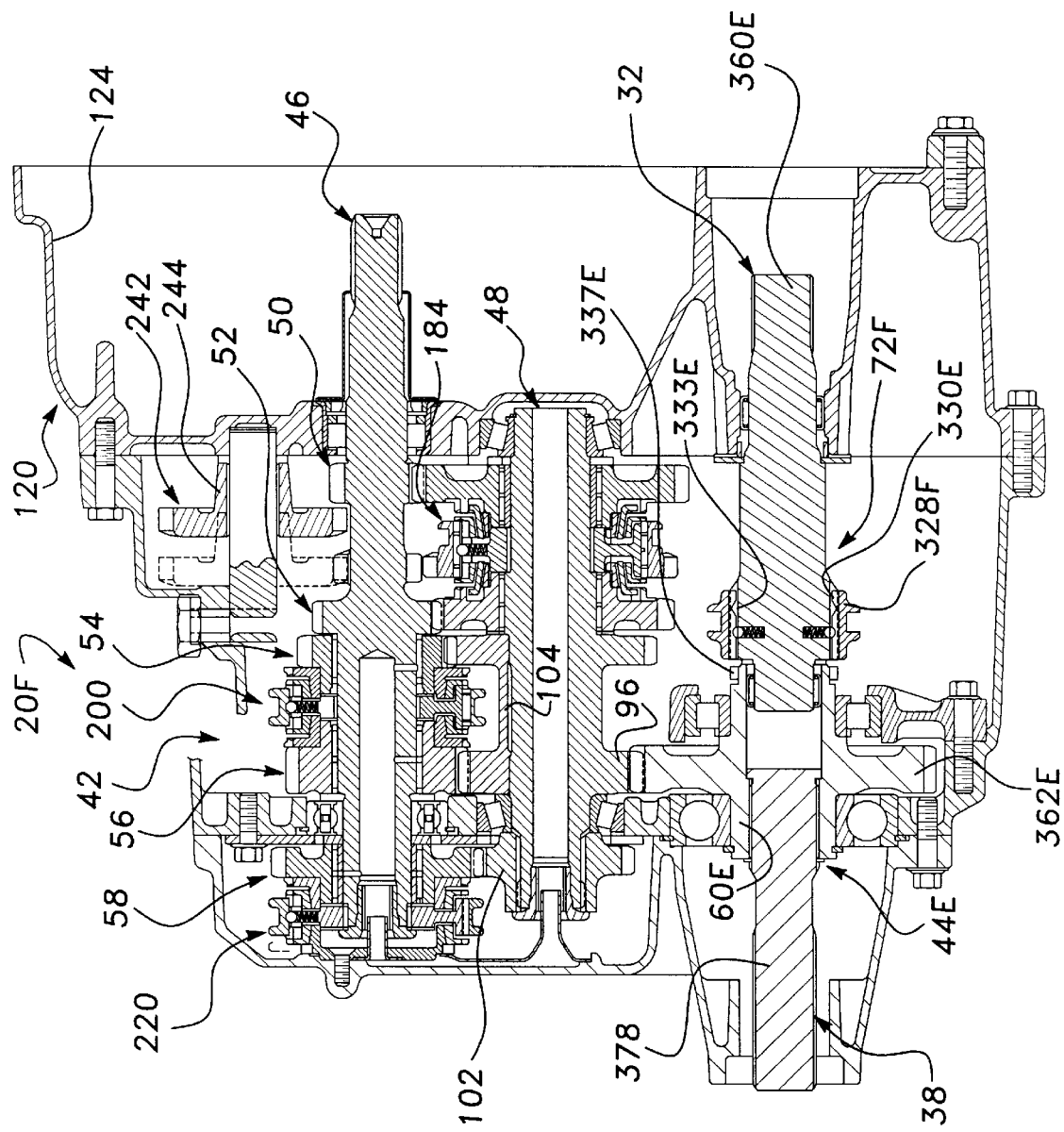
FIG. 14 is a partial sectional view of an alternative mode shift mechanism for the transmission shown in FIG. 13.

Finally, FIG. 14 illustrates a transmission 20F having a non-synchronized version of mode selection mechanism 72E, hereinafter identified by reference numeral 72F, wherein mode collar 328F can move from its 2WD position shown to its 4WD position for directly coupling quill shaft 60E to front yoke shaft 360E.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A transmission for use in a motor vehicle having an engine and front and rear drivelines, said transmission comprising:

a housing;

a first shaft supported for rotation in said housing and adapted to be driven by the engine;

a second shaft supported for rotation in said housing;

a plurality of constant-mesh gearsets arranged for selectively coupling said second shaft to said first shaft for driven rotation at various speed ratios;

a third shaft supported for rotation in said housing;

a first gear fixed to said third shaft and rotatably driven by said second shaft;

an interaxle differential mounted in said housing and having an input member rotatably driven by said third shaft, a first output member adapted to be interconnected to the front driveline, and a second output member adapted to be interconnected to the rear driveline, said interaxle differential operable for permitting speed differentiation between said first and second output members while delivering drive torque thereto; and a clutch operable for coupling any two of said input and output members of said interaxle differential to prevent speed differentiation between said first and second output members, said clutch including a lock-out collar operable in a locked position to directly couple said input member to one of said output members for shifting said interaxle differential into a locked mode, and said lock-out collar is operable in an open position to uncouple said input member from said one output member for permitting speed differentiation between said output members of said interaxle differential.

2. The transmission of claim 1 wherein one of said gearsets includes an input gear rotatably supported on said first shaft which is meshed with a drive gear fixed to said second shaft, and a clutch for selectively coupling said input gear to said drive gear, said transfer gear being in constant meshed engagement with said drive gear.

3. The transmission of claim 1 further comprising a drive pinion fixed to said second shaft with said transfer gear in constant mesh with said drive pinion.

4. The transmission of claim 1 further comprising a second clutch operable for selectively disconnecting one of said first and second output members from driven connection with its corresponding driveline.

5. The transmission of claim 4 wherein said second clutch includes a mode collar operable in a 4WD position whereat said one of said first and second output members is coupled to its corresponding driveline for establishing a four-wheel drive mode, and said mode collar is operable in a 2WD position whereat said one of said first and second output members is uncoupled from its corresponding driveline for establishing a two-wheel drive mode.

6. The transmission of claim 5 wherein said second clutch further comprises a synchronizer for causing speed synchronization between said one of said first and second output members and its corresponding driveline in response to movement of said mode collar to said 4WD position.

7. The transmission of claim 1 wherein said interaxle differential is a planetary gear assembly wherein said input member is a carrier rotatably driven by said third shaft and having a plurality of pinion gears supported thereon, wherein said first output member is a sum gear sixed to a first output shaft that is coupled to one of the front and rear drivelines, and wherein said second output member is a ring gear coupled to a second output shaft which is interconnected to the other of the front and rear drivelines, said pinion gears being in meshed engagement with said sun gear and said ring gear.

8. A transmission for use in a motor vehicle having an engine and front and rear drivelines, said transmission comprising:

a housing;

an input shaft supported for rotation in said housing and adapted to be driven by the engine;

a mainshaft supported for rotation in said housing;

a plurality of constant-mesh gearsets arranged for selectively coupling said mainshaft to said input shaft for driven rotation at various speed ratios;

a drive shaft supported for rotation in said housing;

a transfer gear fixed to said drive shaft and rotatably driven by said mainshaft;

an interaxle differential mounted in said housing and having an input member rotatably driven by said drive shaft, a first output member adapted to interconnected to the front driveline, and a second output member adapted to be interconnected to the rear driveline, said interaxle differential operable for permitting speed differentiation between said first and second output members while delivering drive torque thereto; and a clutch operable for coupling any two of said input and output members to prevent speed differentiation between said first and second output members, said clutch including a lock-out collar operable in a locked position to directly couple said input member to one of said output members for shifting said interaxle differential into a locked mode, and said lock-out collar is operable in an open position to uncouple said input member from said one output member for permitting speed differentiation between said output members of said interaxle differential.

9. The transmission of claim 8 further comprising a second clutch operable for selectively disconnecting one of said first and second output members from driven connection with its corresponding driveline.

10. The transmission of claim 9 wherein said second clutch includes a mode collar operable in a 4WD position whereat said one of said first and second output members is coupled to its corresponding driveline for establishing a four-wheel drive mode, and said mode collar is operable in a 2WD position whereat said one of said first and second output members is uncoupled from its corresponding driveline for establishing a two-wheel drive mode.

11. The transmission of claim 10 wherein said second clutch further comprises a synchronizer for causing speed synchronization between said one of said first and second output members and its corresponding driveline in response to movement of said mode collar to said 4WD position.

12. A transmission for use in a motor vehicle having an engine and front and rear drivelines, said transmission comprising:

a housing;

a first shaft supported for rotation in said housing and adapted to be driven by the engine;

a second shaft supported for rotation in said housing;

a plurality of constant-mesh gearsets arranged for selectively coupling said second shaft to said first shaft for driven rotation at various speed ratios;

a third shaft supported for rotation in said housing;

a transfer gear fixed to said third shaft and rotatably driven by said second shaft;

an interaxle differential mounted in said housing and having an input member rotatably driven by said third shaft, a first output member adapted to interconnected to the front driveline, and a second output member adapted to be interconnected to the rear driveline, said interaxle differential operable for permitting speed differentiation between said first and second output members while delivering drive torque thereto;

a clutch operable in a 2WD mode for uncoupling one of said first and output members from its corresponding driveline for establishing a two-wheel drive mode, and said second clutch is further operable in a 4WD mode for coupling said one output member to its corresponding driveline for establishing a four-wheel drive mode; and a second clutch operable in a locked mode for directly coupling two of the three members of said interaxle differential for preventing speed differentiation between said first and second output members, said second clutch is further operable in an open mode for permitting differential action across said interaxle differential.

13. The transmission of claim 12 wherein said clutch includes a mode collar movable between a 4WD position whereat said one of said first and second output members is coupled to its corresponding driveline for establishing a four-wheel drive mode, and a 2WD position whereat said one of said first and second output members is uncoupled from its corresponding driveline for establishing a two-wheel drive mode.

14. The transmission of claim 13 wherein said clutch further comprises a synchronizer for causing speed synchronization between said one of said first and second output members and its corresponding driveline in response to movement of said mode collar to said 4WD position.

15. A motor vehicle comprised of:

an engine;

a first driveline interconnecting a set of first wheels;

a second driveline interconnecting a set of second wheels; and a transmission comprising a first shaft driven by said engine, a second shaft, a plurality of constant-mesh gearsets arranged for selectively coupling said second shaft to said first shaft for driven rotation at various speed ratios, a third shaft interconnected to said first driveline, a transfer gear fixed to said third shaft and rotatably driven by said second shaft, and a mode select mechanism operable for selectively coupling said third shaft to said second driveline, said mode select mechanism including a mode collar movable between a 4WD position whereat said third shaft is coupled to said second driveline for establishing a four-wheel drive mode, and a 2WD position whereat said third shaft is uncoupled from said second driveline for establishing a two-wheel drive mode, said mode select mechanism further including a synchronizer for causing speed synchronization between said third shaft and said second driveline in response to movement of said mode collar to said 4WD position.

16. A transmission for use in a motor vehicle having an engine and first and second drivelines, comprising:

an input shaft adapted to be driven by the engine;

a first output shaft adapted to be coupled to the first driveline;

a second output shaft adapted to be coupled to the second driveline;

a mainshaft;

a multi-speed geartrain for selectively coupling said mainshaft for rotation with said input shaft at various speed ratios;

first and second range gears supported for rotation relative to said first output shaft and driven by said mainshaft;

a first clutch for selectively coupling said first range gear to said first output shaft for establishing a high-range drive connection therebetween, said first clutch is further operable for selectively coupling said second range gear to said first output shaft for establishing a low-range drive connection therebetween; and a second clutch operable in a 4WD mode for coupling said second output shaft to said first output shaft for establishing a four-wheel drive mode, said second clutch is further operable in a 2WD mode for uncoupling said second output shaft from said first output shaft for establishing a two-wheel drive mode.

17. The transmission of claim 16 wherein said second clutch includes a mode collar operable in a first position to directly couple said second output shaft to said first output shaft for establishing said 4WD mode, and said mode collar is operable in a second position to uncouple said first and second output shafts for establishing said 2WD mode, and wherein said second clutch further includes a synchronizer for causing speed synchronization between said first and second output shafts in response to movement of said mode collar from its second position to its first position.

18. The transmission of claim 16 wherein said first and second range gears are rotatably supported on a quill sleeve fixed for rotation with said first output shaft and wherein said first clutch is operable for selectively coupling said first and second range gears to said quill shaft.

19. The transmission of claim 16 wherein said first output shaft is a rear output shaft.

* * * * *

UNITED STATES PATENT AND TRADEMARK OFFICE
CERTIFICATE OF CORRECTION

PATENT NO. : 5,885,182
DATED : March 23, 1999
INVENTOR(S) : John R. Forsyth

It is certified that error appears in the above-indentified patent and that said Letters Patent is hereby corrected as shown below:

ON THE TITLE PAGE, Under U.S. PATENT DOCUMENTS Reference 5,702,321, "Bakowshi" should be --Bakowski--.

Column 1, line 7, "November 3" should be --November 13--.

Column 2, line 12, "a" (2nd occurrence) should be --an--.

Column 9, line 19, "operable" should be --operably --.

Column 11, line 16 (2nd occurrence), "a" should be --an--.

UNITED STATES PATENT AND TRADEMARK OFFICE
CERTIFICATE OF CORRECTION

PATENT NO. : 5,885,182
DATED : March 23, 1999
INVENTOR(S) : John R. Forsyth

It is certified that error appears in the above-indentified patent and that said Letters Patent is hereby corrected as shown below:

Column 15, line 35, claim 7, "sixed" should be --fixed--.

Column 15, line 58, claim 8, after "adapted to" insert --be--.

Column 16, line 47, claim 12, after "and" insert --second--.

Signed and Sealed this

Twenty-ninth Day of August, 2000

Attest:

Attesting Officer

Q. TODD DICKINSON
Director of Patents and Trademarks